United States Patent
Amagai et al.

(10) Patent No.: US 7,029,542 B2
(45) Date of Patent: Apr. 18, 2006

(54) LEAD-FREE SOLDER ALLOY

(75) Inventors: Masazumi Amagai, Tsukuba (JP);
Masako Watanabe, Oita (JP); Kensho Murata, Beppu (JP); Osamu Munekata, Souka (JP); Yoshitaka Toyoda, Satte (JP); Minoru Ueshima, Misato (JP); Tsukasa Ohnishi, Souka (JP); Hiroshi Okada, Souka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 194 days.

(21) Appl. No.: 10/614,351

(22) Filed: Jul. 8, 2003

(65) Prior Publication Data
US 2005/0036902 A1 Feb. 17, 2005

(30) Foreign Application Priority Data

Jul. 9, 2002 (JP) ............................ 2002-199666
Jul. 26, 2002 (JP) ............................ 2002-217925

(51) Int. Cl.
*C22C 13/00* (2006.01)
*B23K 35/26* (2006.01)

(52) U.S. Cl. ...................... 148/400; 420/560; 420/561; 420/562

(58) Field of Classification Search ................ 148/400; 420/560–562
See application file for complete search history.

(56) References Cited

U.S. PATENT DOCUMENTS

| 5,520,752 A | 5/1996 | Lucey, Jr. et al. ........... 148/400 |
| 6,319,461 B1 * | 11/2001 | Domi et al. ................. 420/557 |
| 2003/0021718 A1 * | 1/2003 | Munekata et al. ........... 420/560 |

FOREIGN PATENT DOCUMENTS

| EP | 0847829 | | 6/1998 |
| EP | 1213089 | | 6/2002 |
| JP | 2000015476 | * | 1/2000 |
| WO | 9709455 | | 3/1997 |

OTHER PUBLICATIONS

Patent Abstracts of Japan, vol. 2000, No. 01, Jan. 31, 2000. Abstract for JP 11 277290 A (Murata Mfg. Co. Ltd.), which was published on Oct. 12, 1999.

* cited by examiner

Primary Examiner—Sikyin Ip
(74) Attorney, Agent, or Firm—Michael Tobias

(57) ABSTRACT

A lead-free solder alloy comprises 1.0–5.0 wt % Ag, 0.01–0.5 wt % Ni, one or both of (a) 0.001–0.05 wt % Co and (b) at least one of P, Ge, and Ga in a total amount of 0.001–0.05 wt %, and a remainder of Sn. The solder can form solder bumps which have a high bonding strength and which do not undergo yellowing after soldering.

12 Claims, 1 Drawing Sheet

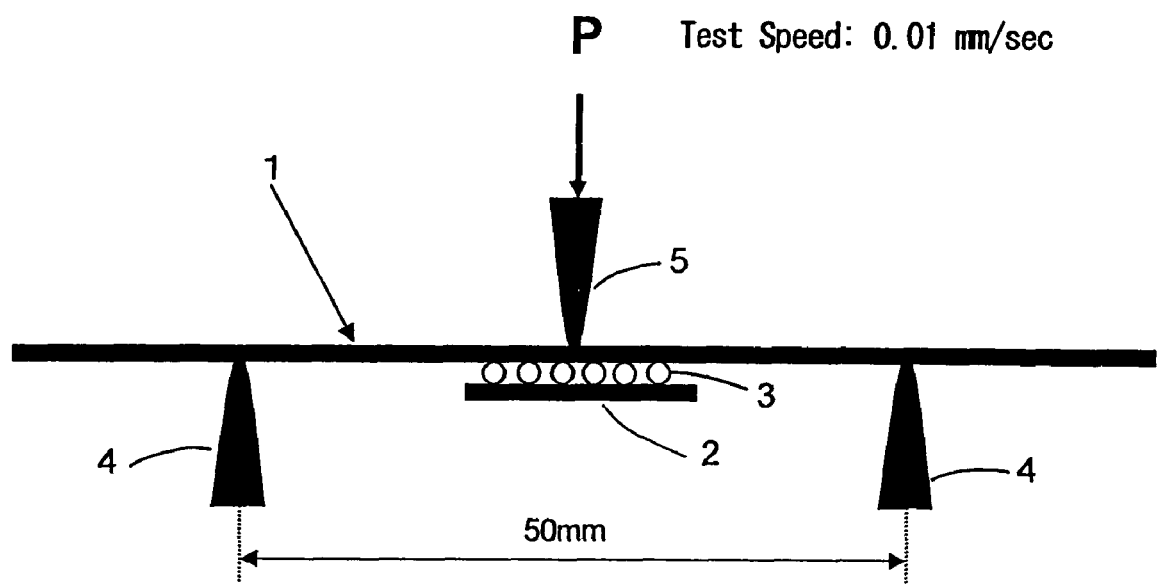

LEAD-FREE SOLDER ALLOY

TECHNICAL FIELD

This invention relates to a lead-free solder alloy, and in particular to a lead-free solder alloy which exhibits excellent properties when used to form minute soldered joints, such as soldered joints formed by solder bumps.

BACKGROUND ART

Solder bumps are used to solder electronic parts to printed circuit boards. For example, with semiconductor packages such as BGA (ball grid array) devices and a considerable proportion of CSP's (chip size packages) and MCM's (multi-chip modules), solder bumps are formed on the electrode pads of a substrate for the package and used to electrically and physically connect the package to a printed circuit board by reflow soldering.

Solder bumps are also used as means for wireless bonding of a semiconductor chip to a substrate or to a printed circuit board. Wireless bonding methods using solder bumps include the TAB (tape automated bonding) method and the flip chip method. The flip chip method is one form of the DCA (direct chip attachment) method (also called the bare chip assembling method). Although the DCA method can also be performed by wire bonding, wireless bonding using solder bumps, such as the flip chip method, has recently been increasingly employed in the DCA method, particularly in the field of mobile or portable electronic products.

Wire bonding technology is extremely advanced, but it still requires a certain amount of time, since the electrodes of an electronic part must be bonded in sequence rather than simultaneously when wire bonding is employed, and the gold wires which are used for wire bonding are expensive. Furthermore, when a semiconductor chip has a large number of electrodes near its center, it may be impossible to form connections to all the electrodes by wire bonding, since some of the wires may end up contacting each other, which is not permissible.

These problems of wire bonding are eliminated by wireless bonding. Wireless bonding is in general less expensive than wire bonding because gold wires are no longer used, and its productivity is superior since a large number of connections can be formed at the same time. In addition, the problem of wires contacting each other does not occur.

Solder alloys which have conventionally been used for soldering of electronic parts have been, in most cases, Pb—Sn solder alloys. Pb—Sn alloys have excellent solderability and relatively low melting temperatures, so they are very suitable for soldering electronic parts to printed circuit boards with little occurrence of soldering defects, thus making it possible to form reliable soldered joints.

When electronic equipment which has been manufactured using a Pb—Sn solder alloy malfunctions or becomes obsolete, it is frequently simply discarded instead of being repaired or renovated. Some of the constituent materials of discarded electronic equipment (metal used in frames, plastic used in cases, glass used in displays) can be recovered and reused, but printed circuit boards in discarded electronic equipment generally cannot be reused, so they are typically disposed of by burial in landfills. This is because the resins and copper foil used to form a printed circuit board are tightly adhered to each other, and solder is metallically bonded to the copper foil, so these materials cannot be readily separated from one another.

If printed circuit boards which are disposed of by burial are contacted by acid rain which has seeped into the ground, Pb in the solder is dissolved out of the solder by the acid rain, and water containing Pb seeps further into the ground and mixes with underground water and may enter the water supply. If water containing Pb is consumed for long periods by humans, the Pb accumulates within the body and may eventually cause lead poisoning. To avoid the harmful effects of Pb in water supplies, the use of Pb in solder is now regulated around the world, and as a result, there is a great interest in the electronics industry in lead-free solders which do not contain Pb.

Most lead-free solders are based on Sn, and further include one or more alloying elements such as Ag, Cu, Bi, In, Zn, Ni, Cr, P, Ge, and Ga.

Some examples of binary lead-free solder alloys which have been used in the past are Sn—Cu, Sn—Sb, Sn—Bi, Sn—Zn, and Sn—Ag solder alloys. In general, Sn-based lead-free solders have inferior solderability compared to conventional Pb—Sn solders. Particularly, Sn—Cu and Sn—Sb solder alloys have poor solderability. Sn—Bi solder alloys tend to form brittle soldered joints, which are not only readily peeled off upon application of an impact, but may be lifted off if they are contaminated with a small amount of Pb which is introduced into the joints from the plating on a lead. Sn—Zn solder alloys have problems because Zn is a base metal. For example, when a Sn—Zn solder alloy is used in the form of a solder paste, the paste may degrade rapidly to such a degree that it cannot be applied by printing, or galvanic corrosion may occur in soldered portions after soldering is completed. Thus, among Sn-based lead-free solders, Sn—Ag solder alloys are superior to other binary lead-free solder alloys with respect to properties such as solderability, brittleness, and aging (storage stability).

However, Sn—Ag lead-free solder alloys do not always have sufficient bonding strength, particularly when used to form joints having a very small bonding area. There is an ongoing trend to increase the performance while decreasing the size of electronic equipment, which creates a demand for increases in the performance and decreases in the size of electronic parts incorporated into such equipment. Taking a BGA device as an example, the number of electrodes formed thereon is increasing while the overall size thereof is decreasing. As a result, the most compact BGA devices have nearly the same tiny pitch between solder bumps as CSP's (chip size packages), so they are also considered to be CSP's. Thus, the diameters of solder bumps to be formed on the electrode pads of electronic parts are also becoming smaller, but at the same time, a bonding strength comparable to that of larger-diameter bumps is demanded. While the bonding strength of a conventional Sn—Ag lead-free solder alloy may be sufficient when it is used to form large-diameter bumps, the bonding strength is not adequate for small-diameter solder bumps such as those formed on CSP's.

During manufacture, an electronic part is often subjected to a burn-in test, which determines whether the electronic part is capable of operating properly at an elevated temperature. The conditions of a burn-in test differ depending upon the manufacturer, but typical test conditions are a test period of 12 hours at a temperature of 125° C. After a burn-in test, if the electronic part is one having solder bumps, the part is inspected with image processing equipment to determine whether any of the solder bumps are missing or misshapen.

It has been observed that the surface of a solder bump formed from a Sn—Ag lead-free solder alloy on an electronic part may become yellowed during a burn-in test. If the surface of a solder bump becomes yellowed, image processing equipment used in subsequent inspection of the solder bump may not accurately detect solder bumps which have been yellowed, thereby producing inaccurate results. For example, there is the possibility of defective solder bumps in a part not being detected or of a part having satisfactory bumps being erroneously rejected as defective. Thus, yellowing of solder bumps during burn-in testing is undesirable.

DISCLOSURE OF THE INVENTION

The present invention provides a Sn—Ag based lead-free solder which has a sufficient bonding strength even when used to form minute soldered bumps. It also provides a Sn—Ag based lead-free solder alloy which does not turn yellow on its surface when exposed after soldering to a high temperature, for example, in a burn-in test.

The present inventors found that if a small amount of Ni is added along with a small amount of at least one of (a) Co and (b) at least one of P, Ge, and Ga to a Sn—Ag solder alloy, the bonding strength of the alloy is improved by a synergistic effect of Ni with Co and/or P, Ge, or Ga. They also found that the addition of a small amount of P, Ge, or Ga is effective in order to prevent the surface of the solder from turning yellow when exposed to a high temperature.

A lead-free solder alloy according to the present invention comprises 1.0–5.0 wt % Ag, 0.01–0.5 wt % Ni, at least one of (a) 0.001–0.05 wt % Co and (b) at least one of P, Ge, and Ga in a total amount of 0.001–0.05 wt %, and a remainder of Sn.

Thus, the lead-free solder alloy according to the present invention may comprise any of the following combinations:

(1) 1.0–5.0 wt % Ag, 0.01–0.5 wt % Ni, 0.001–0.05 wt % Co, and a remainder of Sn, or (2) 1.0–5.0 wt % Ag, 0.01–0.5 wt % Ni, at least one of P, Ge, and Ga in a total amount of 0.001–0.05 wt %, and a remainder of Sn, or (3) 1.0–5.0 wt % Ag, 0.01–0.5 wt % Ni, 0.001–0.05 wt % Co, at least one of P, Ge, and Ga in a total amount of 0.001–0.05 wt %, and a remainder of Sn.

The present invention also provides solder balls formed from the solder alloy and a solder paste which comprises a powder of the solder alloy mixed with a flux. It also provides an electronic part having a plurality of solder bumps formed from the solder alloy according to the present invention.

In the present invention, an electronic part refers to a part which is mounted on a printed circuit board, including a packaged electronic part having a substrate, such as a BGA device, CSP, or MCM, and a bare electronic part such as a semiconductor chip to be bonded by the flip chip method or other form of the DCA method. An electronic part may also be an intermediate or unfinished electronic part such as a substrate for use in the manufacture of a packaged electronic part or a semiconductor wafer.

BRIEF DESCRIPTION OF THE DRAWING

The accompanying FIGURE schematically shows a bending test employed in the example.

DETAILED DESCRIPTION OF THE INVENTION

In a Sn—Ag based lead-free solder, Ag has the effect of increasing bonding strength and solderability, but if it is present in an amount of less than 1.0 wt %, these effects cannot be realized. However, increasing the amount of Ag beyond 5.0 wt % does not produce further benefits, and since Ag is expensive, addition of a large amount thereof is undesirable from the standpoint of economy. Therefore, in the present invention, the content of Ag is 1.0–5.0 wt % and preferably 1.0–4.0 wt %.

Even when the amount of Ag in a Sn—Ag lead-free solder is made 5.0 wt %, a sufficient bonding strength may not be obtained with minute soldered joints, such as joints formed by small-diameter solder bumps. However, if Ni is added to an Sn—Ag solder alloy together with Co and/or at least one of P, Ge, and Ga, the bonding strength of the alloy can be increased to a level sufficient for minute soldered joints.

If the amount of Ni added to a Sn—Ag solder is less than 0.01 wt %, the bonding strength of the alloy is not increased, while if the amount of Ni is greater than 5.0 wt %, the melting point of the alloy becomes too high, and solderability deteriorates. Therefore, the Ni content is 0.01–5.0 wt % and preferably 0.02–0.2 wt %.

The bonding strength of the alloy is further increased by adding (a) Co, or (b) at least one of P, Ge, and Ga, or both (a) and (b), in addition to Ni. Of these alloying elements, Co is more effective at increasing the bonding strength of the alloy. P, Ge, and Ga each serve to refine the microstructure of the alloy, thereby increasing the bonding strength thereof. These elements also have the effect of preventing yellowing of the alloy's surface after soldering when exposed to a high temperature, which interferes with inspection of solder bumps with image processing equipment. The addition of a single one of P, Ge, or Ga is sufficient to provide these effects, but any two or more of these elements may be added.

Which of Co and/or at least one of P, Ge, and Ga is added to a solder alloy according to the present invention may be selected depending on the application of the solder alloy. For example, if the solder alloy is used to form very minute solder bumps such as those formed on CSP's or on a bare silicon chip or wafer, it is preferable to add Co, with or without at least one of P, Ge, and Ga, in order to further increase the bonding strength. If inspection of solder bumps is performed after soldering, it is preferable to add at least one of P, Ge, and Ga, with or without Co.

When added, the amount of Co is in the range of 0.001–0.05 wt %, and the total amount of at least one of P, Ge, and Ga is in the range of 0.001–0.05 wt %. If the amount of Co which is added is smaller than 0.001 wt %, it does not appreciably increase the bonding strength of the alloy, while if more than 0.05 wt % of Co is added, as is the case with Ni, the melting point of the alloy increases, and this has an adverse effect on solderability. If the total amount of P, Ge, and Ga is less than 0.001 wt %, yellowing of the solder alloy cannot be prevented, while if this total amount is more than 0.05 wt %, the addition thereof impedes solderability. A preferable amount of Co is 0.005–0.03 wt %, and a preferable total amount of P, Ge, and Ga is 0.002–0.01 wt %.

A lead-free solder alloy according to the present invention has an improved bonding strength, particularly when used to form minute soldered joints such as joints formed by small-diameter solder bumps. In addition, due to the addition of one or more of P, Ge, and Ga, the surface of the solder bumps can be prevented from becoming yellow in a high temperature environment after soldering.

The formation of solder bumps can be performed using either solder balls or solder paste. When the solder bumps are formed from solder balls, such as in the case of BGA devices, the solder bumps are formed by placing solder balls on the electrode pads of a substrate (or a semiconductor chip or wafer) and heating the substrate and the solder balls to melt the solder balls. The diameter of solder balls used for typical BGA devices is in the range of 0.6–0.8 mm, but smaller solder balls having a diameter of 0.25–0.5 mm or even smaller may be used for smaller BGA devices such as CSP's and bare chips or wafers.

When the solder bumps are formed from a solder paste, the solder paste is usually applied by screen printing onto the electrode pads of a substrate or a semiconductor chip or wafer. The solder paste is then heated so as to remove the flux completely or nearly completely and melt the solder powder in the paste, thus forming solder bumps on the electrode pads. This method is applicable to form solder bumps on CSP's or bare chips or wafers.

A solder alloy according to the present invention can be used in the form of either solder balls or solder paste to form solder bumps.

The solder alloy may be formed into solder balls by any appropriate method, such as a method in which a thin solder wire is cut into small sections of precise length which are then made spherical by remelting in an oil bath, or a method involving dripping drops of molten solder alloy into an oil bath.

In order for the solder alloy to be used in the form of solder paste, the alloy is formed into a powder by any suitable method, such as the centrifugal atomization (rotating disc) method or the gas atomization method, and the alloy powder is uniformly mixed with a flux. The flux may be either a rosin-based or non-rosin based flux.

Although the solder alloy according to the present invention is particularly beneficial when used to form minute solder bumps from solder balls or solder paste, it can also be advantageously employed to form other types of soldered joints on an electronic part or printed circuit board. Thus, the soldering method is not limited to reflow soldering of solder bumps, and other types of soldering, such as dip soldering or flow soldering can be employed with the solder alloy according to the present invention. Therefore, possible forms of the solder alloy include a wire, a rod, powder, a granule, or the like, in addition to the above-described solder ball and solder paste.

EXAMPLE

Solder alloys having the compositions shown in Table 1 were formed into solder balls having a diameter of 0.3 mm by a method in which a thin solder wire was cut into small sections of precise length which were then made spherical by remelting in an oil bath. The solder balls were subjected to a bending test and a discoloration test to evaluate their bonding strength and resistance to yellowing at a high temperature.

As shown in the accompanying FIGURE, the bending test was performed by applying a bending force to a printed circuit board 1 on which a substrate 2 for use in the manufacture of CSP's (referred to below as a CSP substrate) having solder bumps 3 formed from solder balls was mounted and measuring the amount of deformation of the printed circuit board 1 until the solder bumps 3 between the CSP substrate 2 and the printed circuit board 1 broke. The greater the amount of deformation of the printed circuit board, the greater is the bonding strength of the solder bumps. If the deformation in the test is at least 9.5 mm, the solder alloy is considered to be capable of forming a joint having sufficient reliability even for severe conditions of use. The deformation in the test is preferably at least 10.0 mm.

The bending test was carried out in the following manner. The test results are shown in Table 1.

(1) The solder balls were placed on 150 electrode pads on a CSP substrate measuring 30×120 mm and having a thickness of 0.8 mm.

(2) The CSP substrate on which the solder balls were disposed was heated in a reflow furnace to form the solder balls into solder bumps on the electrode pads of the substrate.

(3) The CSP substrate on which the solder bumps were formed was placed on a glass-epoxy printed circuit board with the solder bumps contacting corresponding connection pads of the board, and the CSP substrate and the printed circuit board were together heated in a reflow furnace to solder the CSP substrate to the printed circuit board.

(4) The printed circuit board having the CSP substrate soldered thereto was left for 10 days at 125° C. in a thermostatic chamber for aging.

(5) After aging, the printed circuit board was subjected to a bending test in the manner shown in the accompanying drawing.

A printed circuit board 1 having a CSP substrate 2 soldered to it through solder bumps 3 was placed with the CSP substrate 2 facing down on two supporting members 4 having a wedge-shaped cross section. The supporting members 4 were spaced from each other by 50 mm, and the CSP substrate 2 was located between the supporting members 4 with its long side (the 120 mm side) extending parallel to the supporting members (i.e., extending normal to the plane of the drawing) and with its center being midway between the supporting members 4. A load was applied at a speed of 0.01 mm/sec to the printed circuit board 1 from above by a pressing member 5 having a wedge-shaped cross section at a location which was midway between the supporting members 4. The amount of deformation of the printed circuit board 1 at rupture of one or more solder bumps 3 between the CSP substrate 2 and the printed circuit board 1, i.e., the amount of movement of the pressing member 5 measured from when the pressing member 5 first contacted the printed circuit board 1 until the solder bumps 3 broke was measured.

The purpose of the discoloration test was to determine whether solder bumps formed from the alloys underwent yellowing when exposed to a high temperature environment after soldering. The discoloration test was carried out as follows.

(1) The solder balls were mounted on electrode pads of a CSP substrate like that used for the bending test.

(2) The CSP substrate on which the solder balls were disposed was heated in a reflow furnace to form the solder balls into solder bumps on the electrode pads of the CSP substrate.

(3) The CSP substrate on which the solder bumps were formed was left for 24 hours in a thermostatic chamber at 150° C., and then the surfaces of the solder bumps were visually observed for yellowing.

The results of the discoloration test are also shown in Table 1. In the table, "No" indicates cases in which there was almost no yellowing, and "Yes" indicates cases in which there was significant yellowing.

Table 1 also shows the results for comparative alloys (No. 10–13) including a conventional Sn—Ag alloy, a Sn—Ag—Cu alloy disclosed in Japanese Patent No. 3,027,441, a Sn—Ag—Ni—Cu alloy disclosed in JP-A 11-277290, and a Sn—Ag—Ni alloy disclosed in JP-A 10-193172, which were tested in the same manner as above.

TABLE 1

| No | Composition (remainder: Sn) | | | | | | | Properties | |
|---|---|---|---|---|---|---|---|---|---|
| | Ag | Ni | Co | P | Ge | Ga | Other | Deformation at bump breakage in bending test (mm) | Discoloration test (yellowing) |
| 1 | 2.5 | 0.1 | | 0.005 | | | | 10.0 | No |
| 2 | 2.5 | 0.1 | | | 0.005 | | | 9.8 | No |
| 3 | 2.5 | 0.1 | | | | 0.005 | | 9.7 | No |
| 4 | 2.5 | 0.1 | | 0.005 | | 0.005 | | 9.8 | No |
| 5 | 2.5 | 0.1 | 0.01 | | | | | 10.8 | Yes |
| 6 | 3.0 | 0.1 | 0.02 | | | | | 10.5 | Yes |
| 7 | 2.5 | 0.1 | 0.01 | 0.008 | | | | 10.7 | No |
| 8 | 2.5 | 0.1 | 0.01 | | 0.005 | | | 10.5 | No |
| 9 | 2.5 | 0.1 | 0.01 | 0.005 | | 0.005 | | 10.1 | No |
| 10 | 3.5 | | | | | | | 8.3 | Yes |
| 11 | 3.0 | | | | | | Cu: 0.5 | 8.0 | Yes |
| 12 | 2.5 | 0.1 | | | | | Cu: 0.5 | 9.0 | Yes |
| 13 | 2.5 | 0.1 | | | | | | 9.3 | Yes |

(Notes) Nos. 1 to 9 are alloys according to the present invention, and Nos. 10 to 13 are comparative alloys.

From Table 1, it can be seen that all the solder alloys according to the present invention had a significantly higher deformation in the bending test than the comparative solder alloys, indicating that they had improved bonding strength. It can also be seen that addition of Ni and at least one of P, Ge, and Ga without Co could improve the bonding strength as indicated by the results of the bending test, although the addition of Co could further improve the bonding strength. Those solder alloys containing one or more of P, Ge, and Ga were able to withstand aging in a high temperature environment without yellowing. Thus, it is expected that solder bumps formed from such solder alloys can be subjected to a burn-in test without undergoing yellowing. In contrast, all the comparative solder alloys underwent yellowing.

Although the solder alloys were tested in the form of solder bumps formed from solder balls in the example, similar results can be expected if they are tested in the form of solder bumps formed from solder paste by screen printing of the paste followed by heating.

As described above, a lead-free solder alloy according to the present invention has a bonding strength after soldering which is stronger than that of a conventional Sn—Ag lead-free solder alloy, so it can provide soldered joints having excellent reliability. Furthermore, when a lead-free solder alloy according to the present invention contains one or more of P, Ge, and Ga, it does not undergo yellowing after soldering even in a high temperature test, so solder bumps formed from the solder alloy can be accurately inspected by image processing equipment.

The Invention claimed is:

1. A lead-free solder alloy consisting of 1.0–5.0 wt % Ag, 0.01–0.5 wt % Ni, at least one of (a) 0.001–0.05 wt % Co and (b) at least one of P, Ge, and Ga in a total amount of 0.001–0.05 wt %, and a remainder of Sn.

2. A lead-free solder alloy as claimed in claim 1 containing 0.001–0.05 wt % Co.

3. A lead-free solder alloy as claimed in claim 1 containing at least one of P, Ge, and Ga in a total amount of 0.001–0.05 wt %.

4. A lead-free solder alloy as claimed in claim 1 containing 0.001–0.05 wt % Co and at least one of P, Ge, and Ga in a total amount of 0.001–0.05 wt %.

5. A solder ball formed from the alloy of claim 1.

6. A solder paste comprising a solder powder of the alloy according to claim 1 mixed with a flux.

7. A solder bump formed from the alloy of claim 1.

8. An electronic part having a plurality of solder bumps formed from the alloy of claim 1.

9. A method of joining two members comprising a step of forming a soldered joint using the alloy of claim 1.

10. A lead-free solder alloy as claimed in claim 1 containing 0.005–0.03 wt % Co.

11. A lead-free solder alloy as claimed in claim 1 containing at least one of P, Ge, and Ga in a total amount of 0.002–0.01 wt %.

12. A lead-free solder alloy as claimed in claim 1 containing 0.02–0.2 wt % Ni.

* * * * *